United States Patent [19]

Aoki et al.

[11] Patent Number: 4,939,003
[45] Date of Patent: Jul. 3, 1990

[54] LIQUID CRYSTAL ELEMENT

[75] Inventors: Takao Aoki, Otsu; Takamasa Harada, Inzaimachi; Kokichi Ito, Matsudo; Koji Iwasa, Funabashi; Norio Kawabe, Otsu; Hiroyuki Ikeuchi, Kyoto, all of Japan

[73] Assignees: Toray Industries, Inc.; Seiko Instruments & Electronics Ltd., both of Tokyo, Japan

[21] Appl. No.: 147,202

[22] Filed: Jan. 22, 1988

[30] Foreign Application Priority Data

Jan. 23, 1987 [JP] Japan .................................. 62-12304
Nov. 18, 1987 [JP] Japan .................................. 62-291155

[51] Int. Cl.$^5$ .............................................. C09K 3/34
[52] U.S. Cl. ........................................ 428/1; 350/341
[58] Field of Search ..................... 428/1; 350/340, 341

[56] References Cited

U.S. PATENT DOCUMENTS 4,618,514 10/1986 McClelland ................... 350/341 X
4,759,614 7/1988 Yokokura et al. .............. 350/341 X Primary Examiner—Alexander S. Thomas
Attorney, Agent, or Firm—Birch, Stewart, Kolasch & Birch

[57] ABSTRACT

Disclosed is a liquid crystal element with an improved orientation layer and a coating composition for forming such an orientation layer. The orientation layer consists essentially of a polymer with a Mark-Houwink coefficient of not less than 0.85, the Mark-Houwink coefficient being represented by the formula [I]:

$$[\eta] = K \cdot M^\alpha \qquad \text{[I]}$$

wherein $[\eta]$ represents intrinsic viscosity of the polymer determined by solution viscosity measuring method, K represents a constant, M represents molecular weight of the polymer, and $\alpha$ represents the Mark-Houwink coefficient. The coating composition comprises a polyfumaric acid ester represented by the formula [I]:

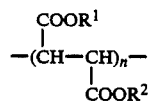

wherein $R^1$ and $R^2$, are the same or different and each represents a straight or branched alkyl group, cycloalkyl group, haloalkyl group, silalkyl group or siloxanylalkyl group; and a halogen-containing organic solvent.

15 Claims, 1 Drawing Sheet

U.S. Patent     Jul. 3, 1990     4,939,003
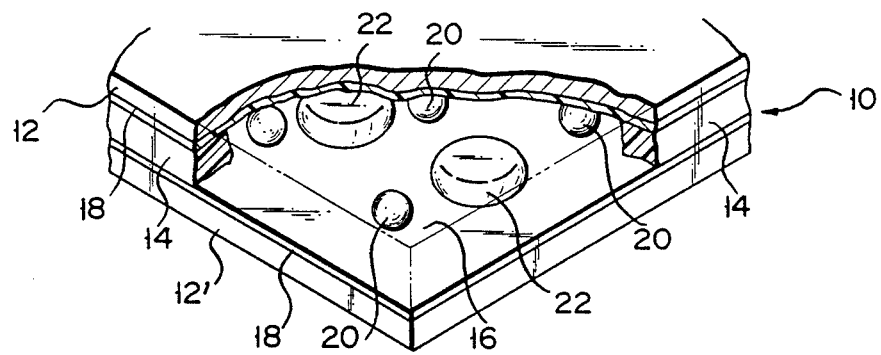
F I G. 1
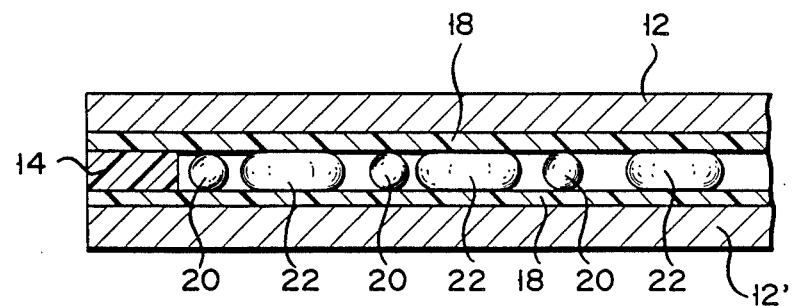
F I G. 2

LIQUID CRYSTAL ELEMENT

BACKGROUND OF THE INVENTION

I. Field of the Invention

This invention relates to a liquid crystal element with an improved orientation layer, which is used in display panels, liquid crystal shutters and the like.

II. Description of the Prior Art

A conventional liquid crystal element comprises a pair of glass substrates secured by a sealing material to face each other so as to define a chamber therebetween. An electrode film for conducting electric power for driving the element is attached on the outside of each of the substrates. On the inside of each substrate, an orientation layer for orienting liquid crystal contained in the chamber is formed. To obtain a high contrast ratio and quick response characteristics of the element, the liquid crystal should have a high degree of alignment. Thus, since the liquid crystal is oriented by the orientation layer, the performance of the orientation layer is very important for obtaining a high contrast ratio and quick response characteristics of the liquid crystal element.

Polymers such as polyimide, polyamideimide, polyphenylene oxide and polysulfone are conventionally used for forming the orientation layer of a liquid crystal element. Among these, in view of the heat resistance, adhesiveness, insulation ability and film-forming capacity, the most reliable and most widely used polymer is liquid polyimide (Japanese Patent Disclosure (Kokai) Nos. 56817/82 and 230635/87). However, liquid polyimide has an unsatisfactory performance in the capacity of orienting the liquid crystal molecules. In particular, in a ferroelectric liquid crystal display which is now being developed as a new generation liquid crystal display, the liquid crystal molecules must be oriented into chiral smectic C phase in which the liquid crystal molecules must be arranged almost as in a crystal. It is very difficult to align the liquid crystal molecules in a satisfactory degree with the polyimide. Thus, orientation layers for the high dielectric liquid crystal display are now being intensively investigated by modifying the polyimide (e.g., Japanese Patent Disclosure (Kokai) Nos. 87939/87 and 98327/87). Since polyimid is formed, however, by the reaction between an amine and a carboxylic acid derivative, free ionic groups due to the unreacted amine or carboxylic acid derivative may remain in the layer, which degrade the high degree of alignment of the liquid crystal molecules.

SUMMARY OF THE INVENTION

Accordingly, an object of the present invention is to provide a liquid crystal element with an improved orientation which aligns the liquid crystal molecules in a high degree of alignment and which, in turn, gives a high contrast ratio and quick response characteristics to the liquid crystal element.

Another object of the present invention is to provide a coating composition which may be used for forming the above-mentioned improved orientation layer of a liquid crystal element.

The liquid crystal element of the present invention has a pair of substrates secured by a sealing material to face each other to define a chamber therebetween, an orientation layer formed on the inner side of each of the substrates and liquid crystal contained in the chamber. The orientation layer used in the liquid crystal element of the present invention consists essentially of a polymer with a Mark-Houwink coefficient of not less than 0.85 in at least one solvent. The Mark-Houwink coefficient is expressed by the formula [I]:

$$[\eta] = K \cdot M^\alpha \quad \text{[I]}$$

wherein $[\eta]$ represents intrinsic viscosity of the polymer determined by solution viscosity measuring method, K represents a constant, M represents molecular weight of the polymer, and $\alpha$ represents the Mark-Houwink coefficient.

This invention further provides a liquid crystal element comprising a pair of substrates secured by a sealing material so as to face each other to define a chamber therebetween; an orientation layer formed on the inner side of each of the substrates, which consists essentially of a polyfumaric acid ester represented by the formula [II]:

wherein $R^1$ and $R^2$ are the same or different and each represents a straight or branched alkyl group, cycloalkyl group, haloalkyl group, silalkyl group or siloxanylalkyl group; and a liquid crystal contained therein.

This invention still further provides a coating composition which may be used for forming the orientation layer of the liquid crystal element. The coating composition of the present invention comprises, in the amount effective for forming the orientation layer, a polyfumaric acid ester represented by the formula [II]:

wherein $R^1$ and $R^2$ are the same or different and each represents a straight or branched alkyl group, cycloalkyl group, haloalkyl group, silalkyl group or siloxanylalkyl group; and a halogen-containing organic solvent.

According to the present invention, since the improved orientation layer aligns the liquid crystal molecules in a high degree of alignment, the liquid crystal element of the present invention has a high contrast ratio and quick response characteristics. Thus, the image displayed in the liquid crystal display employing the liquid crystal element of the present invention is very clear and, in a preferred mode of the present invention, the monodomain state (the state in which the inversion of white and black occurs instantly in an image element) close to the ideal state may be accomplished. Further, by applying the coating composition of the present invention, a coated layer with a uniform thickness and a high degree of alignment may easily be formed, the coated layer being suitable for the orientation layer of the liquid crystal element.

BRIEF DESCRIPTION OF THE DRAWINGS

FIG. 1 shows a schematic partially cut-away view of an embodiment of the liquid crystal element of the present invention; and FIG. 2 shows a schematic cross-sectional view of an embodiment of the liquid crystal element of the present invention.

DETAILED DESCRIPTION OF THE PREFERRED EMBODIMENTS

A preferred example of the basic structure of the liquid crystal element of the present invention in which a ferroelectric liquid crystal is used will now be described with reference to FIGS. 1 and 2.

The liquid crystal element 10 has a pair of substrates 12 and 12' which are secured by a sealing material 14 such as epoxy resin adhesive to face each other to define a chamber 16 therebetween. The substrates may be, for example, made of glass, plastics such as polyesters, or silicon wafer. Transparent electrodes such as an ITO, thin film transistor array or thin film diode array may be formed on the substrates. An orientation layer 18 is formed on the inner side of each of the substrate 12 and 12'. Spherical or polygonal particles 20 having a uniform diameter (hereinafter referred to as spacer particles) are uniformly distributed between the pair of substrates 12 and 12' to assure that a prescribed gap is provided between the substrates 12 and 12' even if an external force is applied to the substrates 12 and 12'. The substrates 12 and 12' are fixed to each other via epoxy resin adhesive particles 22 containing a latent curing agent such as phenol-based curing agent, especially an adduct of diglycidyl ether of a bisphenol or a condensation product thereof and a polyphenol such as a bisphenol. Such an epoxy resin adhesive particles are commercially available from Toray Industries, Inc., Tokyo, Japan under the tradename of "Torepearl AD". The distribution density of the "Torepearl AD" may preferably be 1-100 mg per 10 mm ×10 mm area. Liquid crystal (not shown for the purpose of clarity) is contained in the chamber 16. The liquid crystal is oriented by the orientation layers 18. The higher the degree of alignment of the orientation layers, the higher the degree of alignment of the liquid crystal. Thus, the degree of alignment of the orientation layer 18 is very important for the performance of the liquid crystal element 10. The above-described structure is disclosed in, for example, Japanese Patent Disclosure (Kokai) Nos. 174726/87 and 174284/87.

The most characteristic feature of the liquid crystal element of the present invention resides in the structure of the orientation layer 18. Thus, the liquid crystal element of the present invention is not limited to the above-described structure and any liquid crystal element comprising the orientation layer hereinafter described in detail is within the scope of the present invention.

The orientation layer employed in the liquid crystal element of the present invention (hereinafter referred to as just "orientation layer" for short unless otherwise specified) consists essentially of a polymer with a Mark-Houwink coefficient of not less than 0.85 in at least one solvent. The Mark-Houwink coefficient is defined in the following Mark-Houwink-Sakurada equation [I]:

$$[\eta] = K \cdot M^\alpha$$

wherein $[\eta]$ represents intrinsic viscosity of the polymer determined by solution viscosity measuring method, K represents a constant, M represents the molecular weight of the polymer and $\alpha$ represents the Mark-Houwink coefficient. The Mark-Houwink coefficient is preferably not less than 0.90 and more preferably not less than 0.95.

The intrinsic viscosity $[\eta]$ may be determined by a conventional method. That is, the outflow time of a dilute solution of the polymer is measured using Ostwald's viscometer or Ubbelohde's viscometer. Then the relative viscosity ($\eta_{rel}$) is obtained by the following equation:

$$\eta_{rel} = t/t_0$$

wherein $t_0$ is the outflow time of the pure solvent and t is the outflow time of the dilute solution of the polymer. Then the specific viscosity ($\eta_{sp}$) is obtained by the following equation:

$$\eta_{sp} = \eta_{rel} - 1$$

And the reduced specific viscosity ($\eta_{red}$) is the specific viscosity taken per unit concentration (c), $$\eta_{red} = \eta_{sp}c$$

wherein c is the concentration of the polymer.

The intrinsic viscosity $[\eta]$ is the reduced specific viscosity extrapolated to c=0, $$[\eta] = \lim_{c \to 0}(\eta_{sp}/c) = \lim_{c \to 0}(\eta_{rel}/c)$$

An extrapolation to infinite dilution requires measurements of the viscosity at several concentration.

The Mark-Houwink coefficient $\alpha$ and a constant K are determined by plotting $\log[\eta]$ versus logMn or logMw:

$$\log[\eta] = \log K + \alpha \log M$$

In order to determine values of $\alpha$ and K, some absolute method for the determination of molecular weight (Mn, Mw) should be applied, e.g., osmotic pressure, light scattering, or equilibrium sedimentation measurements.

The fact that the Mark-Houwink coefficient of the polymer constituting the orientation layer is 0.85 or more means that the polymer has a rigid and rod-like main chain (rigid structure). It has theoretically been proved that if the Mark-Houwink coefficient of the polymer is not less than 0.85, the polymer has a rod-like shape. In particular, if the polymer has a bulky functional group as a side chain, the free rotation of the main chain of the polymer is hindered, so that the polymer is likely to become rod-like shape.

Any polymer having a Mark-Houwink coefficient of not less than 0.85 may be used for forming the orientation layer as long as it has acceptable characteristics as an orientation layer, such as heat resistance and compatibility with other components such as liquid crystal. Preferred examples of the polymer which may be used for forming the orientation layer may include poly(substituted)acetylenes, polyfumaric acid esters, poly-N-substituted maleimides, poly-N,N,N$^-$,N$^-$,-tetralkylfumaramide, poly(benzylacrylate), poly[1-(N-carboethoxy-phenyl)-methacrylamide, poly(vinyl sulfate), poly(p-diethylphosphono-methylstyrene-co-styrene), poly(methylmethacrylate-co-p-isopropylstyrene), poly[(butylimino)carbonyl][poly(butylisocyanate)], poly(1-isobutyl-3-phenylsilsesquioxane), poly(3-methylbutenesilsesquioxane) and poly(phenylsilsesquioxane).

Among these, poly(substituted)acetylenes and polyfumaric acid esters are most preferred.

Preferred examples of the poly(substituted)acetylenes may include poly(1-trimethylsilyl-1-propyne), poly(tert-butylacetylene), poly(2-octyne), poly(1-chloro-2-phenylacetylene) and poly(1-phenyl-1-propyne). Copolymers of the poly(substituted)acetylenes may also be used for forming the orientation layer as along as the coplymer has a Mark-Houwink coefficient of not less than 0.85. Derivatives of the homopolymer or the copolymer of the substituted acetylenes may also be used if the derivative has a Mark-Houwink coefficient of not less than 0.85. The term "derivative" includes not only those derived by a chemical reaction, but also includes those derived by a physical modification such as heating and plasma treatment. The poly(substituted)acetylenes per se are known and the above-mentioned preferred examples of the poly(substituted)acetylenes are reported to have a Mark-Houwink coefficient of 0.89 to 1.07 (Masuda et al., "Polymer Preprints", Japan, 33, 66 (1984)). Since these polymers are resistant to a temperature of as high as 180° C., even if the introduction of the liquid crystal into the chamber between the substrates or the adhesion of the spacer particles is conducted under a high temperature, the decomposition or the degradation of the polymer is unlikely to occur, so that these polymer are suitable as a material for consituting the orientation layer also in this regard.

The poly(substituted)acetylenes may be produced by a known process of polymerizing the substituted acetylene in the presence of a transition metal catalyst (Masuda et al., Acc. Chem. Res., 17, 51, (1984)).

Polyfumaric acid esters are another group of the most preferred polymers for forming the orientation layer. It was found by Otsu et al that fumaric acid esters can be polymerized to form a polymer with a high degree of polymerization (T. Otsu, N. Toyoda, "Macromol. Chem., Rapid Commun.", 2, 725 (1981), 2, 79 (1981)). It was also disclosed by F. Engelhardt et al in German patent publication Nos. 1,176,871 and 1,520,702 that fumaric acid esters having a bulky substituent such as tert-butyl, cyclohexyl and isopropyl group can be polymerized by radical polymerization to form homopolymers and copolymers. In the above-mentioned references by Otsu et al., the polymerization of the various fumaric acid esters is studied and they found that the polyfumaric acid esters are poor in flexibility and are rigid, and excells in heat resistance because of the rigidity.

In another aspect of the present invention, a liquid crystal element having an orientation layer consisting essentially of a polyfumaric acid ester represented by the following formula [II] is provided. It should be noted that if the orientation layer consists essentially of the polyfumaric acid ester represented by the following formula [II], the liquid crystal element shows high contrast ratio and quick response characteristics, so that this second aspect of the present invention is not restricted by the Mark-Houwink coefficient of the polyfumaric acid ester.

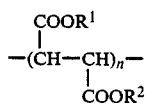

wherein $R^1$ and $R^2$, the same or different, represent straight or branched alkyl group, cycloalkyl group, haloalkyl group, silalkyl group or siloxanylalkyl group. These groups are preferred for promoting the alignment of the liquid crystal by lowering the surface energy. In the preferred examples of the fumaric acid esters, at least one of $R^1$ and $R^2$, the same or different, may be $C_3$–$C_9$ secondary alkyl group or $C_3$–$C_{12}$ cycloalkyl group in view of the great heat resistance up to 200° C. Those of which at least one of $R^1$ and $R^2$, the same or different, are a fluoroalkyl group are also preferred in view of the low surface energy as low as 25 dyns/cm or less. Examples of the fluoroalkyl groups include 2,2,2-trifluoroethyl group, 2,2,2-trifluoro-1-trifluoromethylethyl group, 3,3,4,4,4-pentafluorobutyl group, 3,3,4,4,5,5,6,6,6-nonafluorohexyl group, 1,1,2,2-tetrahydroperfluoroctyl group and 1,1,2,2-tetrahydroperfluorodecyl group. Also preferred are those of which at least one of $R^1$ and $R^2$, the same or different, are a secondary alkyl group such as isopropyl group, cyclohexyl group and cyclopentyl group, and a tertiary alkyl group such as tert-butyl group and tert-pentyl group because polymers with high molecular weight may be obtained.

Copolymers of the polyfumaric acid esters may also be used for forming the orientation layer as along as the coplymer has a Mark-Houwink coefficient of not less than 0.85. Preferred examples of the comonomers for constituting the copolymers of the fumaric acid esters may include monomers serving as an electron donor such as vinyl acetate and styrene because they easily form copolymers. Derivatives of the polyfumaric acid esters may also be used as mentioned above in the description of poly(substituted)acetylene.

Like the poly(substituted)acetylenes, since the polyfumaric acid esters are resistant against a temperature of as high as 180° C., even if the introduction of the liquid crystal into the chamber between the substrates or the adhesion of the spacer particles is conducted under a high temperature, the decomposition or the degradation of the polymer is unlikely to occur. Further, unlike the case of using polyimide, there is substantially no possibility that free ionic groups may remain in the formed layer, so that the stable alignment of the liquid crystal molecules may be retained for a long time.

Polyfumaric acid esters may be produced by known processes including radical polymerization of the fumaric acid ester and polymerization via isomerization of maleic acid esters.

From the view point of attaining a uniform alignment of the liquid crystal, especially in ferroelectric liquid crystal element, it is important for attaining the bistability of the element that the polar portions of the liquid crystal molecules be not interfered. In this respect, the surface tension of the polymer used for forming the orientation layer may preferably be 8–40 dyn/cm which is lower than that of polyimides used for forming the conventional orientation layers. This is also advantageous for the high pretilt angle of the liquid crystal molecules on the polymer surface, which is important for the promotion of the display quality of the image in the liquid crystal element of SBE (super twisted birefringence effect) type liquid crystal element. The surface tension as mentioned above may be determined by obtaining the critical surface tension by Zisman plot based on the measured contact angles of various liquids on the surface of the thin film of the polymer in interest (Zisman, et al., J. Collid Sci., 7, 428 (1952), or by extended Fowkes' equation (Owens, et al., J. Appl. Polymer Sci., 13, 1711 (1969); Kaelble, et al., J. Adhesion, 2, 50 (1970); Hata et al., Journal of Japan Adhesion Society, 8, 131 (1972); Panzer, J. Colloid Sci., 44, 142 (1973)).

The thickness of the orientation layer is not restricted, and may typically be 5–200 nm.

Any known methods including dip-coating method, spin-coating method, brush-applying method, printing method, water surface developing method and Langmuir-Blodgett method (LB method) may be used for forming the orientation layer. Any solution may be used as long as the polymer can be dissolved therein.

The preferred polymers, i.e., the poly(substituted-)acetylenes and polyfumaric acid esters are soluble in common organic solvents such as benzene and chloroform, so that they need not be cyclized by heat-condensation at a high temperature as in the case of using polyimide. Thus, they may easily be applied on plastic substrates with an inferior heat-resistance to the glass substrates. Further, energy may advantageously be saved in forming the orientation layer.

The orientation layer may contain the above-described polymers independently or in combination. Further, the orientation layer may contain other polymers such as polyimide, polyester, polyamide and aramide used in the conventional orientation layer in the amount not degrading the performance of the orientation layer. Further, the orientation layer may be in the form of a multi-layered structure with the conventional orientation layer. Still further, the orientation layer may contain other additives such as silane-based coupling agent for promoting the adhesiveness with the substrate, heat stabilizer, antioxidant and surface active agent. Further, the orientation layer may be attached to the substrate via an adhesive layer made of an adhesive such as silane-based coupling agent.

The orientation layer may be dried by any of the conventional methods and may preferably be subjected to a rubbing treatment with or without a heat treatment. The rubbing treatment may be, for example, conducted by moving a cloth or a brush in one direction several times.

The liquid crystal element of the present invention may be in the form of various liquid crystal elements including ferroelectric liquid crystal (SmC*) elements, TFT (thin film transistor) type liquid crystal elements, SBE (super twisted birefringence effect) type liquid crystal elements, liquid crystal elements employing TN liquid crystal (twisted nematic crystal) and guest-host type liquid crystal elements. The liquid crystal element of the present invention may be used in any of the applications including pocketable televisions, wall type televisions, terminals of personal computers, displays of word processors, liquid crystal shutters and displays in vehicles such as automobiles.

In another aspect of the present invention, a coating composition which may be used for forming the orientation layer is provided. The coating composition of the present invention comprises the above-described polyfumaric acid esters (including copolymers and derivatives thereof) in a halogen-containing organic solvent. The polyfumaric acid ester may be contained in the composition independently or in combination. The halogen-containing organic solvent should dissolve the polymer at room temperature or at an elevated temperature to form a uniform solution. As long as this requirement is met, any halogen-containing organic solvent may be used. Preferred halogen-containing organic solvents may include chlorine-containing organic solvents and fluorine-containing organic solvents in view of the stability of the solvent. Preferred examples of the chlorine-containing organic solvents may include chloroaliphatic hydrocarbons such as chloroform, methylene chloride, trichloroethylene and 1,1,2,2-tetrachloroethane; and chloroaromatic hydrocarbons such as 1-chloronaphthalene and 1,2,4-trichlorobenzene. Preferred examples of the fluorine-containing organic solvents may include fluorocarbons such as 1,1,3-trichlorotrifluoroethane and tetrachlorodifluoroethane; fluorine-containing alcohols such as 2,2,2-trifluoroethanol, 1H,1H,3H-tetrafluoro-1-propanol, 1H,1H,5H-octafluoro-1-pentanol and 1H,1H,7H-dodecafluoro-1-heptanol; and fluorine-containing esters such as trifluoroethyl acetate. Among these, fluorine-containing alcohols are especially preferred in view of the excellent wetting on the substrate and in view of the freedom in selecting a solvent with a desired boiling point.

If the polyfumaric acid ester is dissolved in ketones or ethers at a high concentration, gel is formed and so it is difficult to prepare a solution with high viscosity. In contrast, according to the coating composition of the present invention, since the halogen-containing organic solvent is used, polyfumaric acid esters may be uniformly dissolved at wide range of concentration ranging from a low concentration of 0.1% by weight to a high concentration of 30% by weight, so that the viscosity of the composition may be chosen as desired. Further, by appropriately selecting the conditions for preparing the composition, those having a concentration of more than 30% by weight may also be prepared.

Further, the composition of the present invention has a low surface tension and so has an excellent wetting properties to the substrate. Thus, a coated film with large area free from defects such as pinholes may uniformly be formed.

The composition of the present invention may contain any other components as long as the performance of the coated film is not degraded. For example, the composition may contain other polymers for the purpose of improving the physical properties of the surface of the coated film, or may contain a silane-based coupling agent for promoting the adhesiveness with the substrate. The composition also may contain other additives such as an antioxidant and a surface active agent.

The composition of the present invention may be applied on the substrate by any of the known method as mentioned above in the description of the preparation method of the orientation layer. Depending on the desired thickness or coating method, the viscosity of the composition and the solvent may be chosen appropriately. The composition of the present invention may be employed in wide variety of coating method. The coated film may be dried by any of the methods used for drying the conventional orientation layer.

Since the polyfumaric acid esters contained in the composition of the present invention does not necessitate the cyclization by heat condensation at a high temperature as in the case of using polyimide, the composition may be applied on a plastinc substrate with poor heat resistance and the application step may also be simplified.

The composition of the present invention may be used for forming a coated film with any desired thickness by appropriately selecting the coating method. For example, a monomolecular film may be formed by employing the LB method, and a relatively thick film with a thickness of 1 μm or more may be formed by employing the cast-coating method.

The coated film formed by applying the composition of the present invention may be subjected to various post-treatment. For example, after the film is coated, the film may be heat-treated in an atmosphere of high temperature to increase the packing density of the main chain of the polyfumaric acid esters in the film. This heat-treatment may be conducted, for example, at a temperature of 130° C. to 240° C. for 10 minutes to 180 minutes. The coated film may preferably be subjected to an alignment treatment such as rubbing treatment. The rubbing treatment may be conducted as mentioned above. Further, if the polyfumaric acid ester is poly-tert-butyl fumarate or the like, a part or the whole of the tert-butyl group in the side chains may be converted to carboxylic acids by heat-treatment at a high temperature. This may be conducted by heating the coated film at 180° C. to 250° C. for 10 minutes to 180 minutes.

The orientation layer formed by coating the composition of the present invention has the following characteristics which are suitable as an orientation layer.

(A) The alignment of the liquid crystal molecules is excellent.
(B) The adhesive property to the substrate is high.
(C) Hygroscopicity is small.
(D) Moisture permeability is small.
(E) Dielectric constant is large.
(F) Chemical resistance is high.
(G) Heat resistance is high.
(H) Rubbing properties are good.
(I) Contamination of ionic impurities is small.
(J) Break-down voltage is high.
(K) Light transmission is large.

Among these, the coated layer formed by applying the composition of the present invention excells the conventional polyimide layer in the items (A), (C), (I) and (K), and other items are acceptable. In particular, as mentioned above, the item (A) is very important for obtaining a liquid crystal element with high contrast ratio and quick response characteristics since in the ferroelectric liquid crystal display now under development as a new generation liquid crystal display, the liquid crystal molecules must be aligned in chiral smectic C phase which is similar to a crystal. This high degree of alignment of the liquid crystal, which cannot be attained by using the conventional polyimide layer, may be attained by using the coated layer formed by using the composition of the present invention.

Further, even if the solute of the coating composition is the same polyfumaric acid ester, the coated layer formed by the composition of the present invention which contains the polyfumaric acid ester in a halogen-containing organic solvent exhibits superior alignment properties to that of the coated layer formed by a composition containing the polyfumaric acid ester in an organic solvent such as toluene which does not have a halogen. Although the theory of this phenomenon has not yet been clarified, the observation of the coated layer by wide angle X-ray diffraction revealed that the packing density of the main chain of the fumaric acid ester is higher in the coated layer formed by the composition of the present invention than that of the coated layer formed by a composition containing the polymer in a non-halogen-containing solvent.

The coating composition of the present invention can form a film with low surface energy as low as 35 dyns/cm of critical surface tension since the bulky alkyl group covers the main chain of the polymer. Although this low surface energy may be attained conventionally in the film made of fluorine-containing polymers, very few polymers which can be dissolved in wide variety of solvents and can withstand high temperature of 180° C. can attain the low surface energy. Thus, the composition of the present invention may be used in wide variety of uses other than forming the orientation layer.

[EXAMPLES]

The present invention will now be described by way of examples thereof. The examples are presented for the illustration purpose only and should not be interpreted as restricting the scope of the present invention.

In the following examples, the polyfumaric acid esters were prepared based on the process of Otsu et al (Polymer Bulletin, 11, pp. 453–458 (1984)) and the poly(substituted)acetylenes were prepared in accordance with the process of Masuda et al ("J. Am. Chem. Soc., 105, pp. 7473–7474, (1983)). The content of the components in the compositions are expressed in terms of percent by weight. The mark "*" in the formulae indicates the asymmetric carbon atoms. The ferroelectric liquid crystal elements produced in the examples had the structure shown in FIGS. 1 and 2. As the epoxy resin adhesive particles 22, "Torepearl AD" commercially available from Toray Industries, Inc. of Tokyo, Japan was used.

EXAMPLE 1

On the entire surface of glass substrates on which a transparent electrode (ITO film) with a prescribed pattern was attached, a coating composition comprising polydiisopropyl fumarate (Mw=250,000, Mark-Houwink coefficient α=0.98 in toluene) at a concentration of 0.25% by weight in chloroform was applied with a spinner. The coated composition was dried in ambient atmosphere to form orientation layers of 30 nm thickness. The thus obtained orientation layers were subjected to heat-treatment at 150° C. for 1 hour and then subjected to a rubbing treatment. Two substrates thus obtained were fixed via the adhesive particles, and the peripheries of the two substrates were sealed with an epoxy resin-based adhesive to form a cell.

In the gap between the substrates, a pyrimidine-based ferroelectric liquid crystal composition (disclosed in Japanese Patent Disclosure (Kokai) No. 260564/85) was introduced. The liquid cystal composition had the following composition.

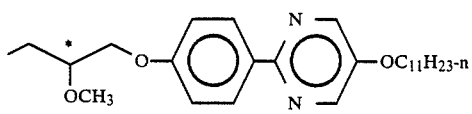 32%

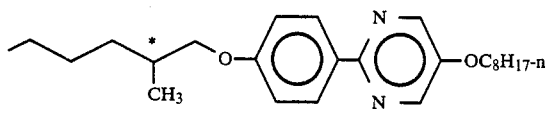 32%

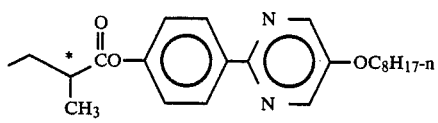 32%

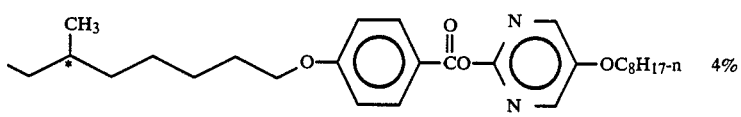 4%

To the liquid crystal element, driving power voltage of 20V was applied. The liquid crystal molecules in the cell showed an excellent bistability and the contrast ratio was 15, and the response time was 60 μsec. Further, the alignment observed using a microscopy was also excellent. Further, a monodomain state (a state in which the inversion of white and black occurs at instant in an image element) close to the ideal state was attained.

In contrast, the contrast ratio and the response time of conventional liquid crystal element employing polyimide films as the orientation layers were 5 and 120 μsec., respectively.

EXAMPLE 2

On the entire surfaces of glass substrates on which an electrode with a prescribed pattern was attached, a composition containing 0.25% by weight of polydicyclohexil fumarate (Mw=450,000, Mark-Houwink coefficient α=1.0 in toluene) in chloroform was applied using a spinner. The coated composition was dried in ambient atmosphere to obtain orientation layers of 20 nm thickness. The orientation layers were subjected to the heat-treatment and to the rubbing treatment as in Example 1. Thereafter, a pyrimidine-based liquid crystal was introduced into the cell to obtain a liquid crystal element as in Example 1. To this liquid crystal element, driving power voltage of 20V was applied. The liquid crystal molecules exhibited bistability and excellent contrast ratio, response time and alignment were obtained as in Example 1.

EXAMPLE 3

On the entire surfaces of glass substrates on which an electrode with a prescribed pattern was attached, a composition containing 0.1% by weight of poly(1-trimethylsilyl-1-propyne) (Mw=1,000,000, Mark-Houwink coefficient α=1.04 in toluene) in chloroform was applied using a spinner. The coated composition was dried in ambient atmosphere to obtain orientation layers of about 100 nm thickness. The orientation layers were subjected to the heat-treatment and to the rubbing treatment as in Example 1. Thereafter, a pyrimidine-based liquid crystal was introduced into the cell to obtain a liquid crystal element as in Example 1. To this liquid crystal element, driving power voltage of 20V was applied. The liquid crystal molecules exhibited bistability and excellent contrast ratio, response time and alignment were obtained as in Example 1.

EXAMPLE 4

On the entire surfaces of glass substrates on which an electrode with a prescribed pattern was attached, a coating composition used in Example 1, 2 or 3 was applied, and the coated films were subjected to the heat-treatment and to the rubbing treatment as in Example 1. Into the cells, an ester-based ferroelectric liquid crystal substance was introduced to obtain liquid crystal elements. One example of the ester-based liquid crystal composition is as follows:

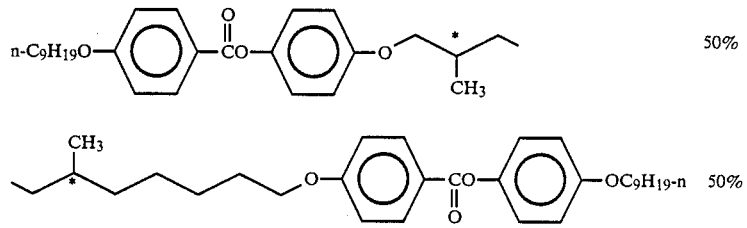

The liquid crystal molecules exhibited bistability, and excellent contrast ratio, response time and alignment were obtained as in Example 1.

EXAMPLE 5

The same procedure as in Example 4 was repeated except that the pair of substrates were arranged to have rubbing directions twisted at right angles to each other, and a nematic type liquid crystal substance was introduced in the cells. The liquid crystal cells thus obtained showed excellent alignment and had a high contrast ratio.

EXAMPLE 6

The same procedure as in Example 5 was repeated except that the twisting angle of the substrates was 170° to 270°. These elements are so called SBE elements. The elements showed excellent alignment and had a high contrast ratio.

EXAMPLE 7

The same procedure as in Example 5 was repeated except that the rubbing directions of the substrates are arranged in parallel so as to obtain the homogeneous alignment and the nematic liquid crystal contained several percent by weight of a pigment. These elements are so called G-H type elements. These elements showed excellent alignment and had a high contrast ratio.

EXAMPLE 8

The same procedure as in Example 1 was repeated except that the solvent of the composition was 1,1,3-trichlorotrifluoroethane. The same excellent results as in Example 1 were obtained.

EXAMPLE 9

The same procedure as in Example 1 was repeated except that the concentration of the polydiisopropyl fumarate was 0.5% by weight. Excellent results as in Example 1 were obtained.

EXAMPLE 10

The same procedure as in Example 9 was repeated except that the solvent of the coating composition was 1H,1H,5H-octafluoro-1-pentanol and the coated composition was dried on a hot plate with a temperature of 140° C. Excellent results as in Example 1 were obtained.

EXAMPLE 11

The same procedure as in Example 1 was repeated except that the coated films were formed by dip-coating method employing a drawing speed of 20 mm/min. Excellent results as in Example 1 were obtained.

EXAMPLE 12

The same procedure as in Example 1 was repeated except that the coating composition contained 0.5% by weight of poly(isopropyl-1,1,2,2-tetrahydroperfluorodecyl fumarate) in trifluoroethyl acetate. Excellent results as in Example 1 were obtained.

EXAMPLE 13

The liquid crystal elements were prepared by following the procedure as in Example 1 except that the liquid crystal introduced into the cells was a liquid crystal with negative dielectric anisotropy ($\Delta\epsilon<0$), that is, SCE5 or SCE6 commercially available from BDH Limited, Dorset, England.

To the thus prepared liquid crystal element, direct current electric field was applied to invert the liquid crystal molecules by the interaction between the permanent dipoles and the electric field. Thereafter, a high frequency alternating voltage to which the movement of the molecules due to the interaction between the dipoles and the electric field were not be able to follow was applied to the element. By so doing, the liquid crystal molecules were arranged vertically to the electric field, that is, in parallel with the substrates. This state is close to the ideal state in which a high contrast ratio is obtained. The contrast ratio was 30:1 when a voltage of 13V and of 15 KHz frequency was applied to the element after the inversion of the liquid crystal molecules.

On the other hand, for the conventional liquid crystal element utilizing polyimide orientation layer, more than 60V of voltage and about 30 KHz of frequency were necessary to obtain the same contrast ratio.

This seems because of the following reason. The force for arranging the liquid crystal molecules in parallel with the substrates is proportional to $\Delta\epsilon E^2$. Therefore, to arrange the molecules in parallel with the substrates, polyimide orientation layer needs the force 16 times stronger than that necessitated by the polyfumaric acid ester orientation layer. Thus, it is assumed that the initial alignment of the polymeric acid ester orientation layer is close to the ideal alignment, while that of the polyimide orientation layer is in a twisted state. The closer the initial state to the ideal state, the lower the voltage and the frequency which are required for arranging the liquid crystal molecules in parallel with the substrates. As for the liquid crystals of which dielectric anisotropy is positive but which is inverted to negative as the frequency is increased, the same effect obtained in using the liquid crystals with negative dielectric anisotropy may be obtained.

EXAMPLE 14

Surface tension of the polymers used in the above examples were determined. Each of the composition was applied by casting on a glass plate and then the solvent was evaporated to obtain a dense film. The contact angles between various liquids and the thus obtained dense film were measured using a contact angle meter CA-D type manufactured by Kyowa Interface Science Inc., Tokyo, Japan, in accordance with the method of Hata et al. (Hata et al., Journal of Japan Adhesive Society, 8, No. 3, pp. 131-141 (1972)) and the surface energy of each of the polymers were calculated. The results are shown in the following table.

TABLE

| Polymer | Surface Tension (dyn/cm) |
| --- | --- |
| Poly(1-trimethylsilyl-1-propyne) | 29 |
| Polydiisopropyl fumarate | 25 |
| Polydicyclohexyl fumarate | 34 |
| Poly(isopropyl-1,1,2,2-tetrahydroperfluorodecyl fumarate | 11 |

We claim:

1. A liquid crystal element comprising:
   a pair of substrates secured by a sealing material to face each other so as to define a chamber therebetween;
   an orientation layer formed on the inner side of each of the substrates which consists essentially of a polymer with a Mark-Houwink coefficient of not less than 0.85 in at least one solvent, the Mark-Houwink coefficient being represented by the formula (I):

$$(\eta) = K \cdot M^\alpha \qquad (I)$$

wherein ($\eta$) represents intrinsic viscosity of the polymer determined by solution viscosity measuring method, K represents a constant, M represents molecular weight of the polymer, and $\alpha$ represents the Mark-Houwink coefficient; and
   a liquid crystal contained in the chamber,
   wherein the polymer consists essentially of a poly(substituted)acetylene, a polyfumaric acid ester, or a copolymer thereof.

2. The liquid crystal element of claim 1 wherein the poly(substituted)acetylene is poly(trimethylsilylpropyne) or a derivative thereof.

3. The liquid crystal element of claim 1, wherein the surface tension of the polymer or the copolymer thereof is 8–40 dyn/cm.

4. The liquid crystal element of claim 1, wherein the orientation layer has a thickness of 5–200 nm.

5. A liquid crystal element comprising:
a pair of substrates secured by a sealing material to face each other so as to define a chamber therebetween;
an orientation layer formed on the inner side of each of the substrates, which consists essentially of a polyfumaric acid ester represented by the formula (II):

wherein $R^1$ and $R^2$ are the same or different and each represents a straight or branched alkyl group, cycloalkyl group, haloalkyl group, silalkyl group or silxanylalkyl group; and
a liquid crystal contained therein.

6. The liquid crystal element of claim 5, wherein at least one of $R^1$ and $R^2$, which are the same or different, represent a secondary alkyl group with 3 to 9 carbon atoms or a cycloalkyl group with 3 to 12 carbon atoms.

7. The liquid crystal element of claim 5, wherein at least one of $R^1$ and $R^2$, which are the same or different, represent a fluoroalkyl group.

8. The liquid crystal element of claim 5, wherein $R^1$ and $R^2$, which are the same or different, represent an ispropyl group, a cyclohexyl group or a derivative thereof.

9. The liquid crystal element of claim 5, wherein the surface tension of the polyfumaric acid ester is 8–40 dyn/cm.

10. The liquid crystal element of claim 5, wherein the orientation layer has a thickness of 5–200 nm.

11. A liquid crystal element comprising:
a pair of substrates secured by a sealing material to face each other so as to define a chamber therebetween;
an orientation layer formed on the inner side of each of the substrates, which consists essentially of a polymer with a Mark-Houwink coefficient of not less than 0.85 in at least one solvent, the Mark-Houwink coefficient being represented by the formula (I):

$$(\eta) = K \cdot M^\alpha \qquad (I)$$

wherein $(\eta)$ represents intrinsic viscosity of the polymer determined by solution viscosity measuring method, K represents a constant, M represents molecular weight of the polymer, and $\alpha$ represents the Mark-Houwink coefficient; and
a liquid crystal contained in the chamber,
wherein the polymer is a polymer selected from the group consisting of poly(substituted)acetylenes, polyfumaric acid esters, poly-N-substituted maleimides, poly-N,N,N−,N−,-tetralkylfumaride, poly(benzylacrylate), poly[1-(N-carboethoxyphenyl)-methacrylamide, poly(vinyl sulfate), poly(p-diethylphosphono-methylstyrene-co-styrene), poly(1-isobutyl-3-phenylsilsesquioxane , poly(3-methylbutenesilsesquioxane) and poly(phenylsilsesquinoxane).

12. The liquid crystal element of claim 11, wherein the Mark-Houwink coefficient of the polymer is not less than 0.95.

13. The liquid crystal element of claim 12, wherein the surface tension of the polymer is 8–40 dyn/cm.

14. The liquid crystal element of claim 11, wherein the Mark-Houwink coefficient of the polymer is not less than 0.90.

15. The liquid crystal element of claim 11, wherein the orientation layer has a thickness of 5–200 nm.

* * * * *